United States Patent [19]

Plourde

[11] 4,143,906

[45] Mar. 13, 1979

[54] MOLDING CLIP

[75] Inventor: Neal N. Plourde, Detroit, Mich.

[73] Assignee: General Motors Corporation, Detroit, Mich.

[21] Appl. No.: 829,727

[22] Filed: Sep. 1, 1977

[51] Int. Cl.² .............................................. B60J 1/02
[52] U.S. Cl. .................................................. 296/84 D
[58] Field of Search ............... 296/84 D, 84 R, 84 A, 296/146; 52/393, 397, 400, 403

[56] References Cited

U.S. PATENT DOCUMENTS 3,611,663  10/1971  Andrey ............................ 291/84 D

*Primary Examiner*—Richard A. Bertsch
*Attorney, Agent, or Firm*—Charles E. Leahy

[57] ABSTRACT

A molding clip for the attachment of a molding is particularly suited for use at the bottom or lower edge of the windshield or rear window where a filler panel has a generally planar surface which is cantilevered toward the window panel and a lateral flange which extends parallel to the window panel. The molding clip has a body portion interposed between the window panel and the body panel flange. The clip is attached to the body panel by a spring arm holding the flange against the body portion and a pair of laterally spaced flex arms urging the body panel surface into engagement with an abutment projecting from the body portion and overlying the body panel surface. A spacer element is integral with each of the flex arms and spaces the body portion from both the window panel and the flange so that the body portion and abutment of the clip may move vertically away from the body panel surface upon resilient yielding of the flex arms. A hook is integral with the abutment and projects downwardly toward the panel surface for mating interengagement with a hook of the molding. The flex arms yield upon forced mating engagement of the molding hook with the abutment hook and resiliently urge the hook downwardly to maintain the mating interengagement with the reveal molding hook.

4 Claims, 7 Drawing Figures

U.S. Patent — Mar. 13, 1979 — 4,143,906
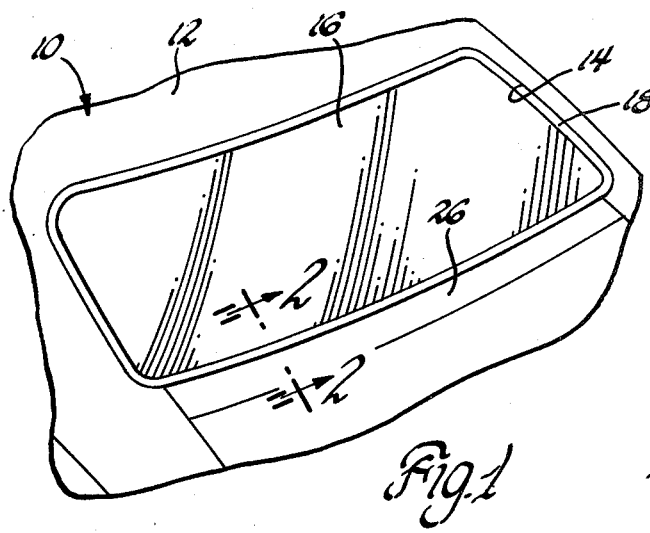
Fig.1
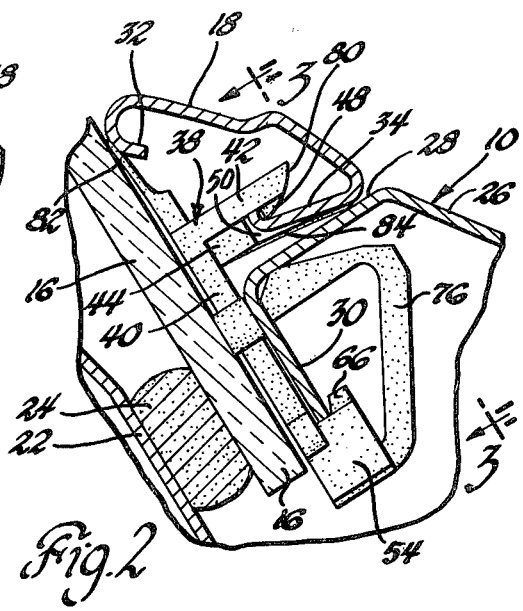
Fig.2
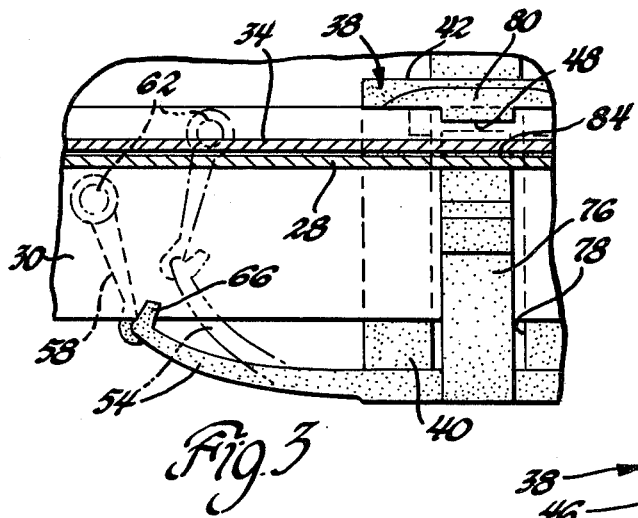
Fig.3
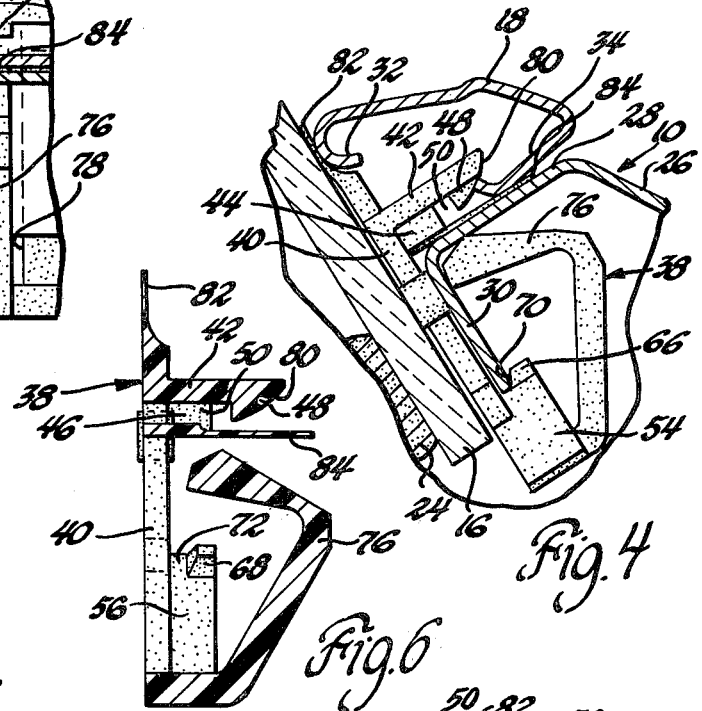
Fig.4
Fig.6
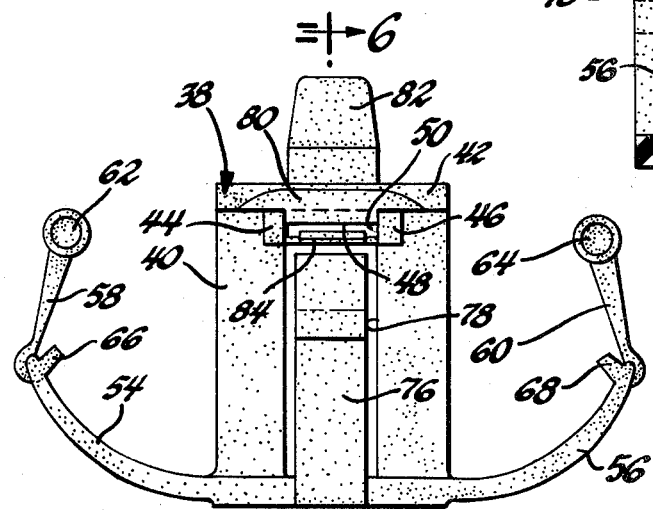
Fig.5
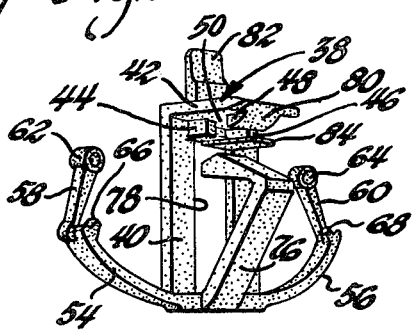
Fig.7

MOLDING CLIP

The invention relates to a molding clip for mounting a reveal molding to conceal the juncture between a vehicle body panel and a fixed window panel.

Conventional vehicle body window panel installations comprise a window panel which is adhesively bonded to a fixed body panel. It is desirable in such window installations to provide a clip which mounts a molding to conceal and embellish the gap at the juncture between the body panel and the window panel.

Some prior art molding clips require the welding of an attaching stud to the vehicle body panel. Other prior art reveal molding clips require embedment in the adhesive which mounts the window panel. Still other prior art molding clips require engagement over the edge portion of the window panel.

This invention provides a molding clip for the attachment of a molding and is particularly suited for use at the bottom or lower edge of the windshield or rear window where a filler panel has a generally planar wall which is cantilevered toward the window panel and a lateral flange which extends parallel to the window panel. The molding clip has a body portion for interposition between the window panel and the body panel flange. The clip is attached to the body panel by a spring arm holding the flange against the body portion and a pair of laterally spaced flex arms urging the planar surface of the body panel into engagement with an abutment projecting from the body portion and overlying the body panel surface. A spacer element is integral with each of the flex arms and spaces the body portion from both the window panel and the flange so that the body portion and abutment of the clip may move vertically away from the panel surface upon resilient yielding of the flex arms. A hook is integral with the abutment and projects downwardly toward the panel surface for mating interengagement with a mating hook of the molding. The flex arms yield upon forced mating engagement of the molding hook with the abutment hook and resiliently urge the hook downwardly to maintain the mating interengagement with the reveal molding hook.

One feature, object and advantage of the present invention is the provision of a reveal molding mounting clip which is mounted on the vehicle body independently of any mechanical engagement over the edge of the window panel or adhesive securement by the window panel mounting adhesive.

Still another feature, object and advantage of the invention is the provision of a molding clip which may be attached to the body panel prior to attachment of the body panel on the vehicle body.

Still another feature, object and advantage of the invention is the provision of a molding clip having resilient means by which the clip is affixed to the vehicle body panel and by which a molding retention hook portion of the clip is resiliently urged into mating interengagement with the reveal molding.

These and other features, objects and advantages of the invention will become apparent upon consideration of the specification and the appended drawings in which:

FIG. 1 is a perspective view of the vehicle body rear window;

FIG. 2 is a sectional view taken in the direction of arrows 2—2 of FIG. 1 and showing the reveal molding attached to the vehicle body by the molding clip;

FIG. 3 is a sectional view taken in the direction of arrows 3—3 of FIG. 2;

FIG. 4 is a view similar to FIG. 2 but showing the reveal molding prior to its installation by the molding clip;

FIG. 5 is a frontal view of the molding clip;

FIG. 6 is a sectional view taken in the direction of arrows 6—6 of FIG. 5; and

FIG. 7 is a perspective view of the molding clip of this invention.

Referring to FIG. 1, there is shown a vehicle body 10 having a body panel 12 defining a rear window opening 14 in which a window panel 16 is conventionally mounted. A reveal molding 18 surrounds the window opening 14 to conceal the juncture between the body panel 12 and window panel 16. The window panel mounting at the top and sides of the window panel 16 is by adhesively seating the glass within a flange defined by welding together the edges of an outer body panel 12 and an inner panel, not shown.

Referring to FIG. 2, the lower edge of the window panel 16 is attached to a vehicle body inner panel 22 by a bead of curable adhesive 24. A filler panel 26 has its rearward edge attached to a vehicle body panel which defines the trunk opening and has a generally planar surface 28 which is cantilevered toward the window panel 16 and a downwardly extending lateral flange 30 which parallels the window panel 16.

The reveal molding 18 is preferably a roll formed aluminum shape or a plastic extrusion or the like and includes reversely bent hooks 32 and 34 which facilitate attachment as well as stiffen the molding.

The molding clip, generally indicated at 38, is injection molded plastic and includes a body portion 40 which is adapted for interposition between the window panel 16 and the flange 30 for overlying the window panel 16 and extending above and below the body panel flange 30. The molding clip 38 has an abutment structure 42 which projects from the body portion 40 and overlies the panel surface 28 as seen in FIG. 2. The abutment structure 42 includes a pair of blocks 44 and 46 and a hook 48 which define a space 50 therebetween as seen in FIG. 5. A pair of flex arms 54 and 56 extend laterally from the body portion 40 and have at the ends thereof integral spacer arms 58 and 60 to which spacer elements 62 and 64 are integrally molded. Spacer elements 62 and 64 have a thickness greater than the thickness of the body portion 40 for purposes which will be discussed hereinafter. Referring to FIGS. 4 and 6, it is seen that the flex arms 54 and 56 have tabs 66 and 68 which are spaced from the spacer arms 58 and 60 to define notches 70 and 72. The clip 38 also includes a spring arm 76 which projects angularly upward from the lower end of body portion 40 and also projects toward body portion 40. A slot 78 in body portion 40 facilitates injection molding of the clip 38.

Referring to FIGS. 3 and 4, it will be understood that the molding clip 38 is attached to the filler panel 26 prior to attachment of the filler panel 26 to the vehicle body 10. The spring arm 76 is yieldable to permit entry of the filler panel flange 30 between the body portion 40 and the spring arm 76. The flex arms 54 and 56 are yieldable from the FIG. 3 phantom line unstressed position to the solid line position to permit the engagement of the lower edge of the panel flange 30 within the notches 70 and 72. The flex arms 54 and 56 and the spring arm 76 resiliently urge the body portion 40 of the molding clip 38 downwardly and urge the panel surface 28 upwardly so that the blocks 44 and 46 of abutment structure 42 engage the body panel surface 28. The spring arm 76 and the notches 72 cooperate to maintain the body panel flange 30 in engagement with the spacer elements 62 and 64. Thus, a plurality of the molding clips 38 may be affixed to the filler panel 26 prior to its assembly to the vehicle body.

Upon assembly of the filler panel 26 to the vehicle body, the body panel planar surface 28 is cantilevered toward the window panel 16 as seen in FIG. 4 wherein the spacer elements 62 and 64 seat upon the window panel 16 to space the body panel flange 30 therefrom. As best seen in FIG. 4, the thickness of the spacer elements 62 and 64 exceeds the thickness of the body portion 40 to space the body portion 40 with both the flange 30 and window panel 16 so that the body portion 40 may move vertically upon flexure of the flex arms 54 and 56 and the spring arm 76.

Referring to FIG. 4, the reveal molding 18 is assembled to the vehicle body by aligning the hook 34 thereof with the hook 48 of abutment structure 42. The hook 48 has a rounded outer surface 80 which cams the abutment structure 42 and body portion 40 upwardly as the hook 34 of reveal molding 18 is forced toward the window panel 16 and under the hook 48.

FIG. 2 shows the reveal molding 18 mounted by the mounting clip 38. It is seen that the hook 34 of the molding 18 mates with the hook 48 and is captured in the space 50 between the hook 48 and the blocks 44 and 46. The flex arms 54 and 56 and the spring arm 76 resiliently urge the body portion 40 downwardly to maintain an effective interengagement between the hook 48 and the reveal molding flange 30.

The molding clip 38 includes a sheild 82 which extends upwardly between the window panel 16 and the hook 32 of reveal molding and a similar shield 84 which extends laterally between the planar surface 28 and the molding hook 34. These shields maintain a slight separation of the molding from the window panel and body panel 12 to prevent squeaks therebetween and prevent corrosion between dissimilar materials.

Thus, it is seen that the invention provides a new and improved clip for attaching a reveal molding to the juncture between a fixed window panel and a vehicle body panel.

The embodiment of the invention in which an exclusive property or privlege is claimed are defined as follows:

1. In a motor vehicle body having a fixed window panel, a vehicle body panel having a generally planar wall angular to the window panel and a lateral flange generally parallel to the window panel, and a reveal molding, a molding clip for mounting the reveal molding to conceal the juncture between the body panel and window panel, said molding clip comprising: a spacer portion interposed between the window panel and the lateral flange of the body panel to set the spacing therebetween and being held against movement relative to the window panel and lateral flange, an attachment portion overlying the planar wall, flexure means interconnecting the spacer portion and the attachment portion to normally bias the attachment portion toward the planar wall, and hook means on the attachment portion matingly engageable with the reveal molding, said flexure means permitting the attachment portion to shift relative to the planar wall and provide a bias resisting such movement, the flexure means permitting the movement of the attachment portion of the clip relative to the spacer portion of the clip during mating engagement of the reveal molding with the hook means of the attachment portion and biasing the attachment portion toward the planar wall to bias the reveal molding into engagement with the planar wall and thereby maintain the mating engagement between the hook means and the reveal molding.

2. In a motor vehicle body having a fixed window panel, a vehicle body panel including a generally planar wall approaching the window panel and a lateral flange extending parallel to the window panel, and a reveal molding, a molding clip for mounting the reveal molding to conceal the jucture between the body panel and window panel, said molding clip comprising:
spacer means adapted for interposition between the window panel and the body panel flange to define a space between;
an abutment overlying the generally planar wall of the body panel;
flexure means adapted to yieldably urge the generally planar wall into engagement with the abutment whereby the molding clip is retained on the body panel independently of any cooperation with the window panel or vehicle body;
hook means overlying the generally planar wall and adapted to mate with the molding upon insertion of the molding between the generally planar wall and the hook means;
said flexure means yielding to permit bodily shifting movement of the clip during mating engagement of the molding flange with the hook means and providing a biasing effort for maintaining the mating engagement between the hook and the molding.

3. In a motor vehicle body having a fixed window panel, a vehicle body panel including a generally planar wall approaching the window panel and a lateral flange extending parallel to the window panel, and a reveal molding having a reversely bent flange, a molding clip for mounting a reveal molding to conceal the juncture between the body panel and window panel, said molding clip comprising:
generally planar body portion adapted for interposition between the window panel and the body panel and having an abutment overlying the generally planar wall;
flexure means extending from the body portion and engaging the flange to urge the generally planar wall of the body panel into engagement with the abutment to retain the molding clip on the body panel independently of any cooperation with the window panel or vehicle body;
spacer means associated with the flexure means and adapted to space the body panel flange and the window panel from the body portion of the clip whereby flexure of the flexure means permits bodily movement of the body portion and abutment relative the body panel and window panel;
hook means integral with the body portion and overlying the generally planar wall and adapted to mate with the molding upon insertion of the reversely bent edge flange between the generally planar wall and the hook;
said flexure means yielding to permit bodily shifting movement of the clip during mating engagement of the reversely bent flange with the hook means and providing a bias effort for maintaining the mating engagement between the hook and the molding.

4. In a motor vehicle body having a window panel, a vehicle body panel including a generally planar wall approaching the window panel and a lateral flange extending parallel to the window panel and a reveal molding having an integral hook structure, a molding clip for mounting the reveal molding to conceal the juncture between the body panel and windown panel, said molding clip comprising:

a generally planar body portion adapted for interposition between the window panel and the body panel flange;

an abutment projecting from the body portion and overlying the generally planar wall of the body panel;

a pair of laterally spaced flexure arms extending from the body portion engaging the edge of the flange to bias the generally planar surface of the body panel toward engagement with the abutment;

spacer arms integral with the flexure arms and adapted to engage the flange and window panel to space the flange from the window panel;

a spring arm engaging the side of the flange opposite the spacer arms to maintain the flange in engagement with the spacer arms;

and a hook means integral with the clip for mating interengagement with the hook structure of the molding;

said flexure arms yieldably urging the clip and hook means in the direction to maintain the mating interengagement with the reveal molding hook structure.

* * * * *